United States Patent
Samuel

(10) Patent No.: US 9,708,901 B2
(45) Date of Patent: Jul. 18, 2017

(54) SYSTEMS AND METHODS FOR HYDRAULIC BALANCING DOWNHOLE CUTTING TOOLS

(71) Applicant: Halliburton Energy Services, Inc., Houston, TX (US)

(72) Inventor: Robello Samuel, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 646 days.

(21) Appl. No.: 14/006,724

(22) PCT Filed: Dec. 28, 2012

(86) PCT No.: PCT/US2012/071965
§ 371 (c)(1),
(2) Date: Sep. 23, 2013

(87) PCT Pub. No.: WO2014/105038
PCT Pub. Date: Jul. 3, 2014

(65) Prior Publication Data
US 2014/0182934 A1 Jul. 3, 2014

(51) Int. Cl.
*E21B 44/04* (2006.01)
*E21B 7/28* (2006.01)
(Continued)

(52) U.S. Cl.
CPC ......... *E21B 44/04* (2013.01); *E21B 7/28* (2013.01); *E21B 10/26* (2013.01); *E21B 10/61* (2013.01)

(58) Field of Classification Search
None
See application file for complete search history.

(56) References Cited

U.S. PATENT DOCUMENTS 7,137,612 B2 * 11/2006 Baca ..................... F16K 1/38
251/122
2005/0104022 A1 5/2005 Baca
(Continued)

FOREIGN PATENT DOCUMENTS

WO 2012162537 A2 11/2012
WO 2014105038 A1 7/2014

OTHER PUBLICATIONS

International Search Report and Written Opinion for PCT/US2012/071965 dated Aug. 8, 2013.
(Continued)

*Primary Examiner* — Caroline Butcher
(74) *Attorney, Agent, or Firm* — McDermott Will & Emery LLP

(57) ABSTRACT

Disclosed are systems and methods of balancing weight and hydraulic energy distribution between downhole cutting tools. One system includes a drill bit arranged at a distal end of the bottom-hole assembly, a first sensor sub arranged proximate to the drill bit and configured to monitor weight-on-bit, a reamer axially-offset from the drill bit on the bottom-hole assembly, a second sensor sub arranged proximate to the reamer and configured to monitor weight-on-reamer, and a communications module communicably coupled to both the first and second sensor subs and configured to receive and process the weight-on-bit and the weight-on-reamer and adjust a hydraulic energy input to at least one of the drill bit and the reamer when a ratio between the weight-on-bit and the weight-on-reamer surpasses a predetermined operating threshold.

16 Claims, 3 Drawing Sheets

(51) Int. Cl.
E21B 10/26 (2006.01)
E21B 10/61 (2006.01)

(56) References Cited

U.S. PATENT DOCUMENTS

2009/0020334 A1* 1/2009 Gavia ................. E21B 41/0078
175/57
2010/0139981 A1 6/2010 Meister et al.

OTHER PUBLICATIONS

Office Action received in corresponding Canadian application No. 2,889,130 dated Apr. 20, 2016.

* cited by examiner

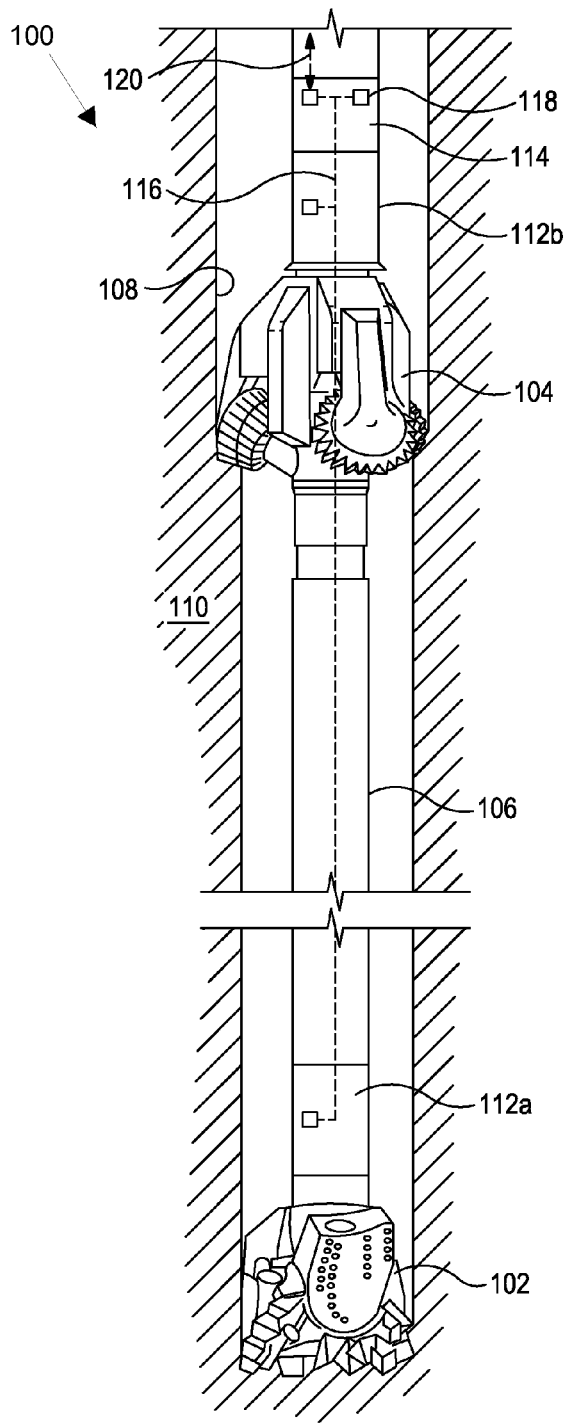
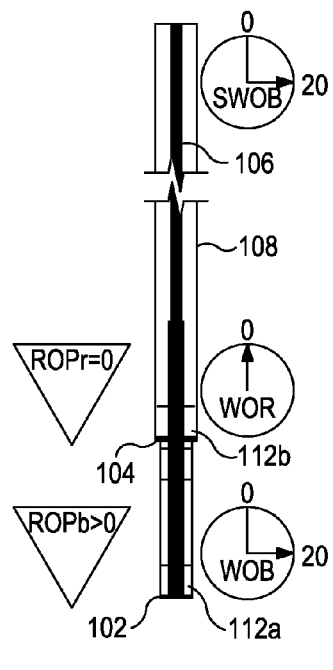
FIG. 2A
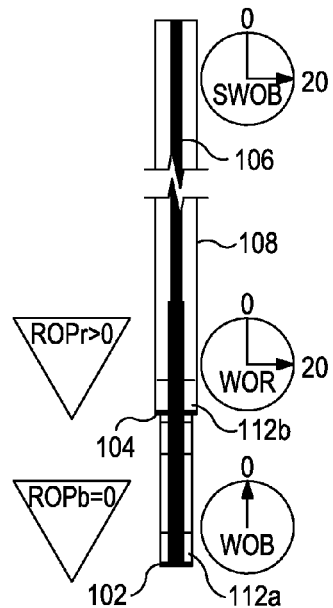
FIG. 2B
FIG. 1

SYSTEMS AND METHODS FOR HYDRAULIC BALANCING DOWNHOLE CUTTING TOOLS

CROSS-REFERENCE TO RELATED APPLICATIONS

This application is a national stage entry of and claims priority to International Patent Application No. PCT/US2012/71965, which was filed on Dec. 28, 2012.

BACKGROUND

The present disclosure relates to drilling wellbores in subterranean formations and, more particularly, to systems and methods of balancing weight and hydraulic energy distribution between individual downhole cutting tools.

Wellbores are formed in subterranean formations for various purposes including, for example, the extraction of oil and gas and the extraction of geothermal heat. Such wellbores are typically formed using one or more drill bits, such as fixed-cutter bits (i.e., "drag" bits), rolling-cutter bits (i.e., "rock" bits), diamond-impregnated bits, and hybrid bits, which may include, for example, both fixed cutters and rolling cutters. The drill bit is coupled either directly or indirectly to an end of a drill string or work string, which encompasses a series of elongated tubular segments connected end-to-end that extends into the wellbore from the surface. Various tools and components, including the drill bit, are often arranged or otherwise coupled at the distal end of the drill string at the bottom of the wellbore. This assembly of tools and components is commonly referred to as a "bottom hole assembly" (BHA).

In order to form the wellbore, the drill bit is rotated and its associated cutters or abrasive structures cut, crush, shear, and/or abrade away the formation materials, thereby facilitating the advancement of the drill bit into the subterranean formation. In some cases, the drill bit is rotated within the wellbore by rotating the drill string from the surface while a fluid, such as drilling fluid, is pumped from the surface to the drill bit. The drilling fluid exits the drill string at the drill bit via one or more nozzles arranged therein and may serve to cool the drill bit and flush drilling particulates back to the surface via the annulus defined between the drill string and the exposed surface of the wellbore. In other cases, however, the drill bit may be rotated by coupling the drill bit to a downhole motor (e.g., mud motor) also coupled to the drill string and disposed relatively proximate to the drill bit. The drilling fluid pumped from the surface may power the downhole motor to rotate the drill bit and subsequently exit out of the drill bit nozzles and circulate back up to the surface via the annulus.

To enlarge the diameter of the wellbore, a "reamer" device (also referred to as a "hole opening device" or a "hole opener") may be used in conjunction with the drill bit as part of the BHA. The reamer is typically axially-offset and uphole from the drill bit along the length of the BHA. In operation, the drill bit operates as a pilot bit to form a pilot bore in the subterranean formation, and the reamer follows the drill bit through the pilot bore to enlarge the diameter of the wellbore as the BHA advances into the formation.

As the wellbore is drilled, axial force or weight is applied to the drill bit and the reamer from the surface via the drill string which causes the cutting tools to advance into the formation. This force is generally referred to as the "weight-on-bit" (WOB) and the "weight-on-reamer" (WOR). Efficient drilling with both the bit and the reamer can significantly affect performance and rate of penetration (ROP) into the formation. However, managing the WOB and the WOR when they are simultaneously used can be very difficult. There may be several scenarios that can impede drilling efficiency, thereby achieving not only low ROP but also premature wear on the downhole tools. For instance, a wellbore may extend through different formations or layers of geological material, and each formation may exhibit different physical properties. Some formations may be relatively soft and are easily drilled through, while others are relatively hard and difficult to drill through. As the wellbore advances through a relatively hard formation and into an underlying softer formation, the drill bit will quickly remove material from the softer formation while the reamer continues to more slowly ream out the wellbore in the harder formation. Consequently, the ratio between WOB and WOR may become undesirably and unevenly distributed between the reamer and the drill bit.

An imbalanced weight distribution between the reamer and the drill bit can result in imbalanced cuttings generation at each cutting tool, which can result in bit balling as the inefficiently flushed cuttings will tend to agglomerate about the cutting tools. During drilling operations, as briefly mentioned above, cuttings are flushed away from the cutting tools using the drilling fluid injected into the wellbore from the surface and eventually ejected out of each cutting tool via one or more nozzles defined therein. Since the nozzle sizes in each of the drill bit and reamer are selected prior to tripping into the wellbore, the hydraulic flowrate diverted through the reamer and the drill bit, and thus the hydraulic energy applied thereto, are also fixed.

The hydraulic energy expended at each cutting tool is mainly based on the pressure drop across the nozzles at the drill bit and the reamer and the pressure balance between these cutting tools since these tools are arranged in series along the BHA. Managing the hydraulic flowrate of drilling fluid through the reamer and the drill bit when they are used simultaneously can be fairly difficult. However, when efficiently managed, drilling efficiency increases, thereby increasing rate of penetration into the subterranean formation.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to those skilled in the art and having the benefit of this disclosure.

FIG. 1 is an elevational view of an exemplary bottom hole assembly lowered into a representative wellbore, according to one or more embodiments.

FIGS. 2A, 2B and 2C are schematic diagrams illustrating three different drilling scenarios that may be encountered when drilling a wellbore.

DETAILED DESCRIPTION

Figure 2C:
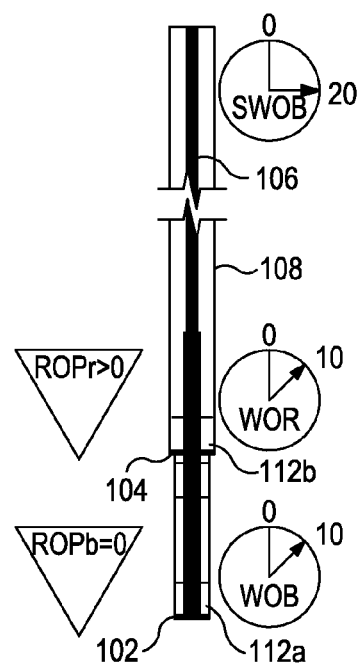

The present disclosure relates to drilling wellbores in subterranean formations and, more particularly, to systems and methods of balancing weight and hydraulic energy distribution between individual downhole cutting tools.

Drilling ultra extended reach wells and extending the reach to a greater depth requires both improved models and comprehensive analysis of the drilling operations. Drilling efficiency is an important issue for ultra-long wells, and optimizing and monitoring the operational efficiency of the various cutting tools is important for successful completion of the wells. The embodiments disclosed herein may prove advantageous in monitoring drilling operations downhole in real-time and effectively managing the hydraulic energy provided to each cutting tool in response to the detected wellbore conditions. As a result, the hydraulic energy and hydraulic flowrate at each cutting tool may be intelligently managed, thereby improving drilling rate of penetration and the overall drilling efficiency.

FIG. 1 is an elevational view of an exemplary bottom hole assembly (BHA) 100 as lowered into a representative wellbore 108, according to one or more embodiments. As illustrated, the BHA 100 may include a drill bit 102 and a reamer 104 axially spaced along a drill string 106 that extends from a surface (not shown). The drill bit 102 and reamer 104 may be configured to drill or otherwise cut a wellbore 108 into a subterranean formation 110 for the purposes of extracting one or more hydrocarbons therefrom. As the drill string 106 advances the BHA 100 into the subterranean formation 110, the drill bit 102 may form the wellbore 108 at a first diameter, and the reamer 104 may follow behind the drill bit 102 to expand the size of the wellbore to a second diameter, where the second diameter is greater than the first diameter. The BHA 100 may be rotated within the wellbore by, for example, rotating the drill string 106 from the surface. In other embodiments, however, a downhole motor or mud pump (not shown) may equally be used to rotate the BHA 100, without departing from the scope of the disclosure.

While not specifically illustrated, those skilled in the art will readily appreciate that the BHA 100 may further include various other types of drilling tools or components such as, but not limited to, a steering unit, one or more stabilizers, one or more mechanics and dynamics tools, one or more drill collars, one or more jars, one or more accelerators and one or more heavy weight drill pipe segments.

The BHA 100 may further include a first sensor sub 112a and a second sensor sub 112b coupled to or otherwise forming part of the drill string 106. The first sensor sub 112a may be arranged adjacent or otherwise proximate to the drill bit 102, and the second sensor sub 112b may be arranged adjacent or otherwise proximate to the reamer 104. The first and second sensor subs 112a,b may be configured to monitor various operational parameters in the downhole environment with respect to the BHA 100. For instance, the first sensor sub 112a may be configured to monitor operational parameters corresponding to the drill bit 102 such as, but not limited to, weight-on-bit (WOB), torque-on-bit (TOB), rotations per minute (RPM) of the drill bit 102, bending moment of the drill string 106 adjacent the drill bit 102, vibration at or near the drill bit 102, and the like. Similarly, the second sensor sub 112b may be configured to monitor operational parameters of the reamer 104 such as, but not limited to, weight-on-reamer (WOR), torque-on-reamer (TOR), rotations per minute (RPM) of the reamer 104, bending moment of the drill string adjacent the reamer 104, vibration at or near the reamer 104, and the like.

In some embodiments, one or both of the first and second sensor subs 112a,b may be a DRILLDOC® tool commercially-available from Sperry Drilling of Houston, Tex., USA. The DRILLDOC® tool, or type of sensor sub 112a,b, may be configured to provide real-time measurements of weight, torque and bending on the adjacent cutting tool (i.e., drill bit 102 and reamer 104) to characterize the transfer of energy from the surface to the cutting tool. As will be appreciated, these measurements help optimize drilling parameters to maximize performance and minimize wasted energy transfer and vibration.

The BHA 100 may further include a bi-directional communications module 114 coupled to or otherwise forming part of the drill string 106. The communications module 114 may be communicably coupled to each of the first and second sensor subs 112a,b via one or more communication lines 116 such that the communications module 114 may be configured to send and receive data to/from the first and second sensor subs 112a,b in real time. Accordingly, the communications module 114 may be provided with real time operational parameters of both the drill bit 102 and the reamer 104 during drilling operations.

In some embodiments, the communications module 114 may include one or more microprocessors 118, such as a closed feedback enabling microprocessor, or the like. The microprocessor 118 may be configured to enable the first and second sensor subs 112a,b to communicate with each other. As a result, the first sensor sub 112a may be apprised of the general operating conditions of the reamer 104 in real time by communicating with the second sensor sub 112b, and the second sensor sub 112b may likewise be apprised of the general operating conditions of the drill bit 102 in real time by communicating with the first sensor sub 112a.

The communications module 114 may further be communicably coupled to the surface (not shown) via one or more communication lines 120 such that the communications module 114 may be able to send and receive data in real time to/from the surface during operation. For instance, the communications module 114 may be configured to communicate to the surface various downhole operational parameter data as acquired via the first and second sensor subs 112a,b. Once received at the surface, an operator may consider the monitored and reported operational parameter data and, if necessary, undertake one or more corrective actions or the like in response. In some embodiments, as described in greater detail below, the one or more corrective actions may include sending one or more command signals or corrective action signals back downhole to the communications module 114 which initiates action on the part of either the drill bit 102 or the reamer 104.

In other embodiments, however, the communications module 114 may communicate with a computerized system (not shown) or the like configured to receive the various downhole operational parameter data as acquired through the first and second sensor subs 112a,b. As will be appreciated, such a computerized system may be arranged either downhole or at the surface. In some embodiments, for example, the communications module 114 itself may serve as the computerized system as described herein. When the downhole operational parameter data surpasses or otherwise breaches one or more predetermined limits of operation, the computerized system may be configured to alert an operator or user to the operational anomaly and, in response, one or more corrective command signals may be sent to the BHA 100 in order to alter the downhole operational conditions to bring the operational parameters back into a safe or efficient operating range. In other embodiments, upon recognizing or otherwise determining a breach or surpassing of the predetermined limit of operation, the computerized system may be configured to automatically send the one or more corrective action signals to the BHA 100, without departing from the scope of the disclosure. Accordingly, the one or more corrective actions may be fully automated, in at least one embodiment.

In yet other embodiments, however, the downhole operational parameter data received by the communications module 114 as acquired through the first and second sensor subs 112a,b may instead be stored in an on-board memory (not shown) arranged in the communications module 114. When stored in the on-board memory, the collected downhole operational parameter data may be converted to depth-based log so that it may be used for post analysis when the BHA 100 is returned to the surface and a technician is able to access the on-board memory and download its contents.

As will be appreciated, the communication lines 116, 120 may be any type of wired or wireless telecommunications devices or means known to those skilled in the art such as, but not limited to, electric wires or lines, fiber optic lines, downhole telemetry techniques (mud pulse, acoustic, electromagnetic frequency, etc.), combinations thereof and the like. In some embodiments, the communications lines 116, 120 may form part of a wired drill pipe system which uses electrical wires to transmit electrical signals to and from the surface.

One of the operational parameters that may be monitored by the first and second sensor subs 112a,b that will have a direct effect on the rate of penetration (ROP) and general efficiency of drilling systems is the WOB and the WOR. The first and second sensor subs 112a,b may be configured to monitor and report to the communications module 114 the WOB and WOR, respectively, in order to determine a ratio between the two parameters. When the ratio between WOR/WOB exceeds a predetermined value or operational threshold, it may be an indication that one of the drill bit 102 or the reamer 104 is bearing an excessive amount of the weight in the drill string 106, thereby adversely affecting drilling efficiency and ROP. Upon detecting this condition, the communications module 114 may be configured to send a signal to the surface indicating the same. At the surface, as described above, an operator or computing system may receive and consider the signal and, if appropriate, undertake one or more corrective actions in response in order to bring the ratio between WOR/WOB back to a safe or suitable operating range.

Those skilled in the art will readily appreciate that drilling with both the drill bit 102 and the reamer 104 can significantly affect performance and thereby affect specific energy calculations. Due to different levels of aggressiveness in the drill bit 102 and the reamer 104, the side cutting force of each tool may result in different corresponding specific energies. For instance, as the BHA 100 advances within the subterranean formation 110, the drill bit 102 and the reamer 104 may drill different formations exhibiting entirely different formation strengths. As a result, each cutting tool may require different specific energies in order to ensure efficient operation and ROP.

Referring to FIGS. 2A, 2B and 2C, with continued reference to FIG. 1, depicted are schematic diagrams illustrating three different drilling scenarios that may be encountered when drilling a wellbore 108. In FIG. 2A, the weight on the drill string 106 as measured at the surface (i.e., "SWOB") may be equal or substantially equal to the WOB as measured by the first sensor sub 112a, e.g., SWOB=WOB=20 kips. As a result, both the WOR and the rate of penetration of the reamer ("ROPr") are zero or close to zero. In such a case, there is little or no load transfer to the reamer 104 and, therefore, little or no cutting force at the reamer 104 which may result in decreased ROP and unwanted vibration in the drill string 106.

In FIG. 2B, the weight measured at the surface SWOB may be equal or substantially equal to the WOR, as measured by the second sensor sub 112b, e.g., SWOB=WOR=20 kips. As a result, both the WOB and the rate of penetration of the drill bit ("ROPb") is zero or close to zero. In such a case, there is little or no load transfer to the drill bit 102 and, therefore, the full cutting action is transferred from the drill bit 102 to the reamer 104. Accordingly, when the load distribution between the drill bit 102 and the reamer 104 becomes imbalanced, such as is shown in FIGS. 2A and 2B, the drilling system may experience imbalanced drilling rates and poor overall ROP.

In FIG. 2C, however, the drilling operation is proceeding efficiently as the first and second sensor subs 112a,b report to the communications module 114 (FIG. 1) that the load between the reamer 104 and the drill bit 102 is substantially balanced. In particular, the SWOB in FIG. 2C is substantially equal (or otherwise within a predetermined range of suitable operation) to the WOB plus the WOR, e.g., WOB 10 kips+WOR 10 kips=SWOB 20 kips. In such a case, the ROPr and ROPb are each greater than zero and therefore the drill string 106 is advancing efficiently into the formation 110 (FIG. 1).

Weight imbalances between the drill bit 102 and the reamer 104 may also disadvantageously result in imbalanced cuttings generation at each cutting tool. Accordingly, when the ratio between WOR/WOB exceeds the predetermined value or operational threshold, as reported by the first and second sensor subs 112a,b and determined by the communications module 114, that may be an indication of excessive cuttings generation at the cutting tool that bears the increased weight load. As discussed above, cuttings are properly flushed away from the cutting tools with drilling fluid ejected out of one or more nozzles arranged within or otherwise forming part of each cutting tool. If the cuttings are not properly flushed or otherwise removed from the wellbore 108, they may agglomerate about the corresponding cutting tool and thereby result in bit balling which may intensify the poor drilling rate and/or ROP.

On occasions where an imbalanced weight distribution between the drill bit 102 and the reamer 104 result in the cutting tools drilling at different ROPs, each cutting tool may require different hydraulic energy in order to adequately flush resulting cuttings away from the cutting tools. The hydraulic energy expended in the drill string 106 is mainly based on the pressure drop across the nozzles at the drill bit 102 and the reamer 104 and the pressure balance between these cutting tools since they are arranged in series on the BHA 100.

According to one or more embodiments of the disclosure, when the first and second sensor subs 112a,b detect an imbalance between the WOB and WOR, which may be an indication of excessive cuttings generation at the cutting tool that bears the increased weight load, the communications module 114 may be configured to send a signal to the surface indicating the same. At the surface, an operator or computing system may receive and consider the signal and, if appropriate, undertake one or more corrective actions in order to increase the hydraulic energy of the cutting tool that bears the increased weight load. As a result, an increased amount of cuttings that would otherwise impede ROP and drilling efficiency may be more efficiently removed from the vicinity of cutting tool.

In some embodiments, an appropriate corrective action may include increasing the flow rate of the drilling fluid from the surface to the drill bit 102 and the reamer 104, and thereby increase the hydraulic energy provided to each cutting tool. Increased hydraulic energy at the drill bit 102 and the reamer 104 may result in an increased flow rate of drilling fluid through the nozzles arranged therein, and therefore an increase in hydraulic efficiency in removing drill cuttings adjacent the corresponding cutting tool. Accordingly, in at least one embodiment, the hydraulic energy provided to each of the drill bit 102 and the reamer 104 may be adjusted manually from the surface by increasing the flow rate of drilling fluid through the drill string 106.

In other embodiments, an appropriate corrective action may include intelligently managing the hydraulic energy and hydraulic flowrate at each of the drill bit 102 and the reamer 104. In at least one embodiment, this may be accomplished by employing one or more adjustable nozzles in each cutting tool. An operator at the surface or a computerized system may be able to manipulate the adjustable nozzles in each cutting tool, thereby regulating or otherwise optimizing the flow rate through each of the drill bit 102 and the reamer 104 which may prove advantageous in improving drilling rate and overall ROP.

Figure 3A:
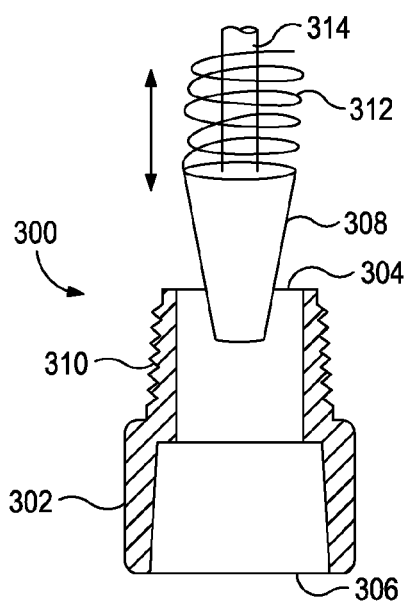
FIGS. 3A and 3B are sequential cross-sectional views of an exemplary adjustable nozzle, according to one or more embodiments.
Figure 3B:
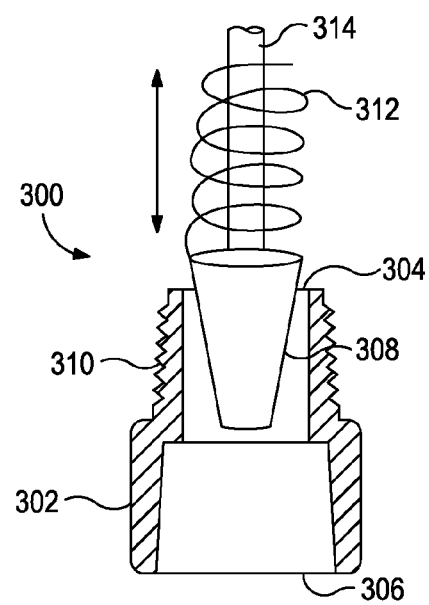

Referring to FIGS. 3A and 3B, with continued reference to FIG. 1, illustrated are sequential cross-sectional views of an exemplary nozzle 300, according to one or more embodiments. It should be noted that the nozzle 300 is depicted for illustrative purposes only, and therefore should not be considered limiting to the scope of the disclosure. Indeed, those skilled in the art will readily recognize that there are several other types and designs of nozzles that may equally be used in the context of the present disclosure, but that do not depart from the scope thereof.

As illustrated, the nozzle 300 may include a body 302 that includes a fluid inlet 304, a fluid outlet 306, and a rod 308 movably arranged at least partially within the body 302. The nozzle 300 may be configured for use in either or both the drill bit 102 and the reamer 104 and, in at least one embodiment, may be threadably attached thereto using threading 310 defined on the body 302. In other embodiments, the nozzle 300 may be coupled or otherwise attached to its respective drill bit 102 or reamer 104 using mechanical fasteners, adhesives, brazing or welding techniques, and the like, without departing from the scope of the disclosure. As will be appreciated, several nozzles 300 may be arranged in or otherwise coupled to each cutting tool, as generally known to those skilled in the art. Some or all of the nozzles used in each cutting tool may be adjustable, as generally described herein. However, it is also contemplated herein to also employ one or more non-adjustable nozzles in conjunction with one or more adjustable nozzles, without departing from the scope of the disclosure.

In some embodiments, the nozzle 300 may further include a spring 312 and a piston 314 coupled to the rod 308. The rod 308 and the piston 314 may be referred to herein as a piston and rod assembly. The spring 312 may be a coil spring, for example, and may exhibit a known spring constant. The piston 314 may be actuated using one or more actuation devices (not shown) including, but not limited to, a hydraulic cylinder, a solenoid, or one or more other electromechanical actuators. Upon actuation, the piston 314 may be extended in order to incrementally extend the rod 308 into the fluid inlet 304, as shown in FIG. 3B. Extending the piston 314 may simultaneously expand the spring 312, thereby storing spring energy that may be used subsequently to retract the rod 308.

In some embodiments, the rod 308 may exhibit a tapered profile such that as it is extended into the fluid inlet 304 the flow area through the fluid inlet 304 is correspondingly decreased. Upon eliminating the axial force applied on the piston 314, the spring 312 may be configured to contract and draw or otherwise retract the rod 308 back out of the fluid inlet 304, as shown in FIG. 3A, thereby correspondingly increasing the flow area of the fluid inlet 304 once again. In other embodiments, however, the spring 312 may be omitted and the piston and rod assembly 308, 314 may instead be drawn back out of the fluid inlet 304 using the one or more actuation devices.

In exemplary operation, when the first and second sensor subs 112a,b detect an imbalance between the WOB and WOR, which may be an indication of excessive cuttings generation at the cutting tool that bears the increased weight load, a corrective action signal may be generated and sent to adjust the appropriate nozzle(s) 300 in order to balance the hydraulic energy between the drill bit 102 and the reamer 104. In some embodiments, the one or more actuation devices configured to actuate the piston 314 may be communicably coupled to the communications module 114 and configured to actuate the piston 314 upon receiving a command or corrective action signal from the communications module 114. As a result, the appropriate nozzle(s) 300 may be manipulated to adjust or otherwise optimize the flow area of the nozzle(s) 300 arranged in the cutting tool that bears the increased weight load.

This may be accomplished by actuating the piston and rod assembly 308, 314 associated with the appropriate or particular nozzle(s) 300. In some embodiments, the corrective action signal received from the communications module 114 may direct the piston 314 to draw the rod 308 out of the fluid inlet 304, as illustrated in FIG. 3A, and thereby increase the flow area and flow rate through the nozzle 300. In other embodiments, the corrective action signal may direct the piston 314 to extend the rod 308 into the fluid inlet 304, as illustrated in FIG. 3B, and thereby decrease the flow area and flow rate through the nozzle 300. As will be appreciated, the corrective action signal may be directed to both the drill bit 102 and the reamer 104 and the corresponding nozzles 300 arranged therein such that the hydraulic energy provided to each cutting tool is substantially balanced.

Figure 4A:
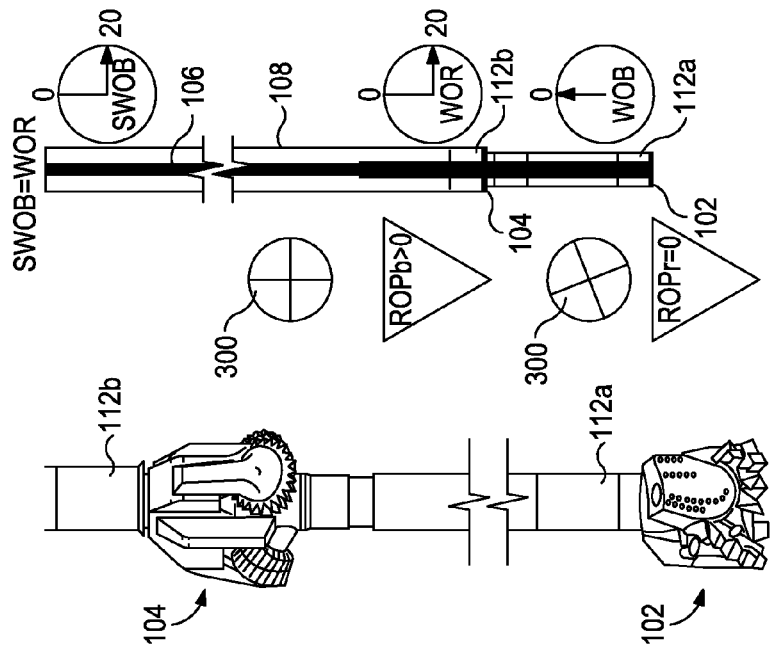
FIG. 4A is a diagram illustrating a scenario where increased hydraulic energy is required at a drill bit, according to one or more embodiments.

There may be several different scenarios when it may prove advantageous to balance and optimize the hydraulic energy at each of the drill bit 102 and the reamer 104. For example, referring now to FIG. 4A, illustrated is a schematic diagram of a scenario where increased hydraulic energy is required at the drill bit 102, according to one or more embodiments. As illustrated, the weight on the drill string 106 as measured at the surface (i.e., "SWOB") may be equal or substantially equal to the WOB as measured by the first sensor sub 112a, e.g., SWOB=WOB=20 kips. As a result, both the WOR and the rate of penetration of the reamer ("ROPr") are zero or close to zero. In such a case, there is little or no load transfer to the reamer 104 and, therefore, little or no cutting force at the reamer 104.

According to embodiments of the disclosure, this condition may be sensed by the first and second sensor subs 112a,b and the nozzle(s) 300 in the drill bit 102 may be adjusted so that more drilling fluid flow is diverted through the drill bit 102 for increased hydraulic energy as well as for increased flow rate for cuttings removal. In some embodiments, the nozzles 300 in the reamer 104 may simultaneously be adjusted such that less drilling fluid flow is diverted through the reamer 104. As a result, the hydraulic energy provided to each cutting tool may be balanced and otherwise optimized.

Figure 4B:
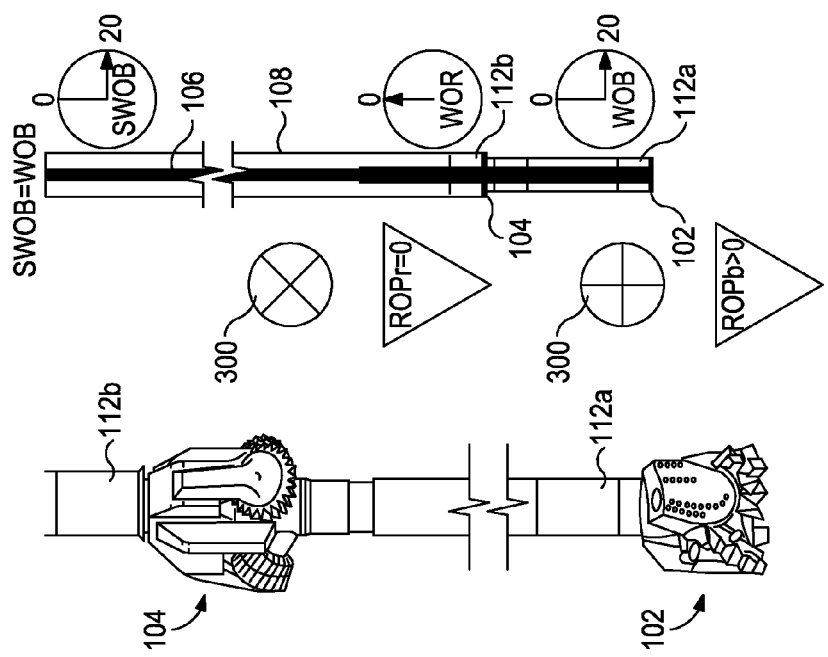
FIG. 4B is a diagram illustrating a scenario where increased hydraulic energy is required at a reamer, according to one or more embodiments.

Referring to FIG. 4B, illustrated is a schematic diagram of a scenario where increased hydraulic energy is required at the reamer 104, according to one or more embodiments. As illustrated, the weight measured at the surface SWOB may be equal or substantially equal to the WOR, as measured by the second sensor sub 112b, e.g., SWOB=WOR=20 kips. As a result, both the WOB and the rate of penetration of the drill bit ("ROPb") is zero or close to zero. In such a case, there is little or no load transfer to the drill bit 102 and, therefore, the full cutting action is transferred from the drill bit 102 to the reamer 104.

According to embodiments of the disclosure, this condition may be sensed by the first and second sensor subs 112a,b and the nozzles 300 (FIGS. 3A and 3B) in the reamer 104 may be adjusted so that more drilling fluid flow is diverted through the reamer 104 for increased hydraulic energy as well as for increased flow rate for cuttings removal. In some embodiments, the nozzles 300 in the drill bit 102 may simultaneously be adjusted such that less drilling fluid flow is diverted through the drill bit 102. As a result, the hydraulic energy provided to each cutting tool may be balanced.

During drilling operations, the first and second sensor subs 112a,b may be continuously in communication with each other via the one or more microprocessors 118 (FIG. 1). As a result, adjustments to the hydraulic energy at each of the drill bit 102 and the reamer may be undertaken in real time, or as soon as the first and second sensor subs 112a,b detect an operational parameter (e.g., ratio between WOB and WOR) that surpasses a predetermined operational threshold limit. When such an anomaly is detected, the BHA 100 may be configured to actuate the nozzles 300 of one or both of the cutting tools in order to balance the hydraulic energy at the drill bit 102 and the reamer 104. As a result, the hydraulic energy between the two cutting tools is manipulated so that that hydro-mechanical specific energy is adjusted to have not only an optimized rate of drilling but also an effective hole cleaning condition.

When the first and second sensor subs 112a,b sense that the operational parameter (e.g., WOB and WOR) is balanced, or otherwise the parameter is again detected within or below the predetermined operational threshold limit, drilling may be resumed or otherwise proceed more efficiently. Moreover, those skilled in the art will readily appreciate that the hydraulic energy provided to each cutting tool and flow area of each nozzle 300 may be adjusted in real time and individually optimized so as to provide increased overall ROP and drilling efficiency.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A bottom-hole assembly, comprising:
   a drill bit and a reamer axially offset from the drill bit;
   a first sensor sub arranged proximate to the drill bit to monitor a weight-on-bit;
   a second sensor sub arranged proximate to the reamer to monitor a weight-on-reamer;
   a communications module communicably coupled to the first and second sensor subs and configured to receive and process the weight-on-bit and the weight-on-reamer; and
   one or more adjustable nozzles included in each of the drill bit and the reamer, wherein each adjustable nozzle is communicably coupled to the communications module and is independently actuatable by the communications module to adjust a hydraulic energy input to the drill bit or the reamer,
   wherein adjustable nozzles included in the drill bit are actuated to adjust a hydraulic energy input to the drill bit when the weight-on-bit is greater than the weight-on-reamer, and wherein adjustable nozzles included in the reamer are actuated to adjust the hydraulic energy input to the reamer when the weight-on-reamer is greater than the weight-on-bit.

2. The bottom-hole assembly of claim 1, wherein the communications module includes one or more microprocessors configured to enable the first and second sensor subs to communicate with each other.

3. The bottom-hole assembly of claim 1, wherein the communications module is communicably coupled to a surface location and configured to send and receive data in real time to and from the surface location.

4. The bottom-hole assembly of claim 3, wherein the data sent from the surface location comprises one or more corrective action signals to adjust the hydraulic energy input.

5. The bottom-hole assembly of claim 1, wherein the one or more nozzles comprise:
   a body having a fluid inlet and a fluid outlet;
   a rod movably arranged at least partially within the body; and a piston coupled to the rod and configured to incrementally extend and retract the rod into and out of the fluid inlet, thereby regulating a fluid flow rate through the one or more nozzles.

6. The bottom-hole assembly of claim of 5, further comprising a spring operatively coupled to the rod and configured to contract and draw the rod out of the fluid inlet.

7. A method of drilling a wellbore, comprising:
monitoring a weight-on-bit with a first sensor sub arranged proximate to a drill bit arranged at a distal end of a bottom-hole assembly;
monitoring a weight-on-reamer with a second sensor sub arranged proximate to a reamer axially-offset from the drill bit along the bottom-hole assembly;
receiving signals representative of the weight-on-bit and the weight-on-reamer with a communications module communicably coupled to both the first and second sensor subs and further communicably coupled to one or more adjustable nozzles included in each of the drill bit and the reamer;
actuating adjustable nozzles included in the drill bit when the weight-on-bit is greater than the weight-on-reamer and thereby adjusting a hydraulic energy input to the drill bit; and
actuating adjustable nozzles included in the reamer when the weight-on-reamer is greater than the weight-on-bit and thereby adjusting the hydraulic energy input to the reamer.

8. The method of claim 7, further comprising enabling the first and second sensor subs to communicate with each other via one or more microprocessors arranged within the communications module.

9. The method of claim 7, further comprising sending and receiving data in real time to and from a surface location, the communications module being communicably coupled to the surface location.

10. The method of claim 7, further comprising actuating the adjustable nozzles with the communications module and thereby adjusting a flow rate of drilling fluid to one of the drill bit or the reamer.

11. The method of claim 7, further comprising:
receiving a corrective action signal with the one or more adjustable nozzles from the communications module; and
actuating the one or more adjustable nozzles based on the corrective action signal.

12. The method of claim 11, wherein at least one of the one or more adjustable nozzles comprises a body having a fluid inlet and a fluid outlet, a rod, and a piston coupled to the rod, the method further comprising:

incrementally extending the rod into the fluid inlet to decrease a fluid flow rate through the at least one of the one or more adjustable nozzles; and
incrementally retracting the rod out of the fluid inlet to increase the fluid flow rate through the at least one of the one or more adjustable nozzles.

13. The method of claim of 12, further comprising:
expanding a spring when the rod is incrementally extended into the fluid inlet; and
contracting the spring to incrementally retract the rod out of the fluid inlet.

14. A method of drilling a wellbore, comprising:
monitoring a weight-on-bit with a first sensor sub arranged proximate to a drill bit arranged at a distal end of a bottom-hole assembly;
monitoring a weight-on-reamer with a second sensor sub arranged proximate to a reamer axially-offset from the drill bit along the bottom-hole assembly;
receiving signals representative of the weight-on-bit and the weight-on-reamer with a communications module communicably coupled to both the first and second sensor subs;
communicating one or more corrective action signals when a ratio between the weight-on-bit and the weight-on-reamer surpasses a predetermined operating threshold;
receiving the one or more corrective action signals with one or more adjustable nozzles included in each of the drill bit and the reamer;
actuating adjustable nozzles included in the drill bit when the weight-on-bit is greater than the weight-on-reamer and thereby adjusting a hydraulic energy input to the drill bit; and
actuating adjustable nozzles included in the reamer when the weight-on-reamer is greater than the weight-on-bit and thereby adjusting a hydraulic energy input to the reamer.

15. The method of claim 14, further comprising actuating the adjustable nozzles and thereby adjusting a flow rate of drilling fluid to one of the drill bit or the reamer.

16. The method of claim 14, wherein communicating one or more corrective action signals comprises:
communicating the weight-on-bit and the weight on the reamer to a surface location with the communications module; and
sending the one or more corrective action signals from the surface location back to the communications module.

* * * * *